United States Patent [19]
Jones

[11] 3,708,183
[45] Jan. 2, 1973

[54] TRAILER HITCH
[75] Inventor: Morris Jones, Gainesville, Tex.
[73] Assignee: David Dale Lloyd, Gainesville, Tex.; a part interest
[22] Filed: Dec. 11, 1970
[21] Appl. No.: 97,103

[52] U.S. Cl. .................................. 280/483, 280/490
[51] Int. Cl. .............................................. B62d 59/00
[58] Field of Search ............................... 280/483, 490

[56] References Cited

UNITED STATES PATENTS

| | | | |
|---|---|---|---|
| 3,166,141 | 1/1965 | Shields | 280/511 |
| 3,236,541 | 2/1966 | Poteet | 280/490 R |
| 3,400,949 | 9/1968 | Kendall | 280/490 R |

FOREIGN PATENTS OR APPLICATIONS

| | | | |
|---|---|---|---|
| 1,454,804 | 11/1965 | France | 280/483 |

Primary Examiner—Benjamin Hersh
Assistant Examiner—Robert R. Song
Attorney—Richards, Harris & Hubbard

[57] ABSTRACT

An improved hitch for connecting a trailer, such as a large mobile home, to a towing vehicle is provided which includes a connector joint attached to a resiliently mounted drawbar adapted to move only in a substantial vertical plane. The resiliently mounted drawbar is carried by a frame which is adapted for immovable attachment to the rear of a towing vehicle.

18 Claims, 4 Drawing Figures

PATENTED JAN 2 1973

INVENTOR:
MORRIS JONES

Richards, Harris & Hubbard
ATTORNEYS

INVENTOR:
MORRIS JONES

Richards, Harris & Hubbard
ATTORNEYS

TRAILER HITCH

This invention relates to trailer hitches for connecting a trailer to a towing vehicle. In another aspect, this invention relates to an improved hitch which will absorb and lessen the shock of vertical movement of towed trailers relative to the towing vehicle and thereby prevent damage to relatively long weak structures, such as mobile homes.

Numerous hitches have been developed for connecting a trailer to a towing vehicle with features which are designed to absorb the shock of vertical movement of the towed trailer relative to the towing vehicle. These hitches include various resilient type hitches adapted for attachment to the rear axle of motor vehicles, or shock absorbing-type hitches adapted for attachment to the chassis of a towing vehicle such as the type which includes a drawbar pivotally connected to the chassis of a towing vehicle, a connector joint on the free end of the drawbar, and a shock absorber means positioned about the midpoint of the drawbar.

Such conventional shock absorbing trailer hitches are generally of the well known ball and socket type wherein the ball is mounted at a 90° angle to the pivotal drawbar. Thus, when the drawbar's movement is cushioned by suitable compressive springs and the like, the ball travels in an arcuate path in response to vertical movement of the socket connected to the trailer. This results in the socket and the trailer tongue also moving in an arcuate path with resulting unwanted stresses building up in the trailer chassis.

Conventional shock absorbing-type trailer hitches have been somewhat successful in reducing the shock of vertical movement and damage to relatively small, short, well-built trailers. However, these trailer hitches have generally not been successful in reducing undue stresses and resultant damage in the larger mobile homes while being towed over great distances. While the large modern mobile homes provide relatively inexpensive living convenience for a great number of people today, it is known that their construction is relatively weak as compared to commercial freight trailers, and that many of these structures do not have sufficient strength to withstand the vibratory forces to which they are subjected when they are hauled by conventional means over relatively long routes. Thus, it is not unusual for great damage to be inflicted to these mobile homes during hauling due solely to the stresses which are developed in them by their movement relative to the towing vehicle.

Therefore, one object of this invention is to provide a novel trailer hitch.

Another object of this invention is to provide a novel trailer hitch for a towing vehicle which when utilized to haul large mobile homes will effectively absorb or dampen vertical movement of the mobile homes relative to the towing vehicle and thereby prevent damage to the chassis of the mobile homes.

According to the invention, a hitch is provided for connecting a trailer to a towing vehicle which includes a resiliently mounted connector joint for attachment to the rear of a towing vehicle which is adapted to move only in a substantially vertical plane. The hitch basically includes a frame means adapted to be immovably attached to the rear of a towing vehicle such as by welding, and a connector joint mounted on a drawbar member which is resiliently mounted in the frame to move only in a substantially vertical plane.

According to a specific embodiment of this invention, a hitch is provided which includes a frame comprising a pair of tubular side members spaced by horizontal support members, the tubular side members having opposed longitudinal slots therethrough; a drawbar member disposed in the frame between the tubular side members having end sections extending through the slots in locking relationship with the tubular side members; compression spring members engaging the upper and lower end sections of the drawbar member within the tubular side members, thereby resisting vertical movement of the drawbar in the frame; and a connector joint operatively connected to the drawbar. Preferably, the connector joint is adjustably mounted on the drawbar.

This invention can be more easily understood from a study of the drawings in which.

Figure 1:
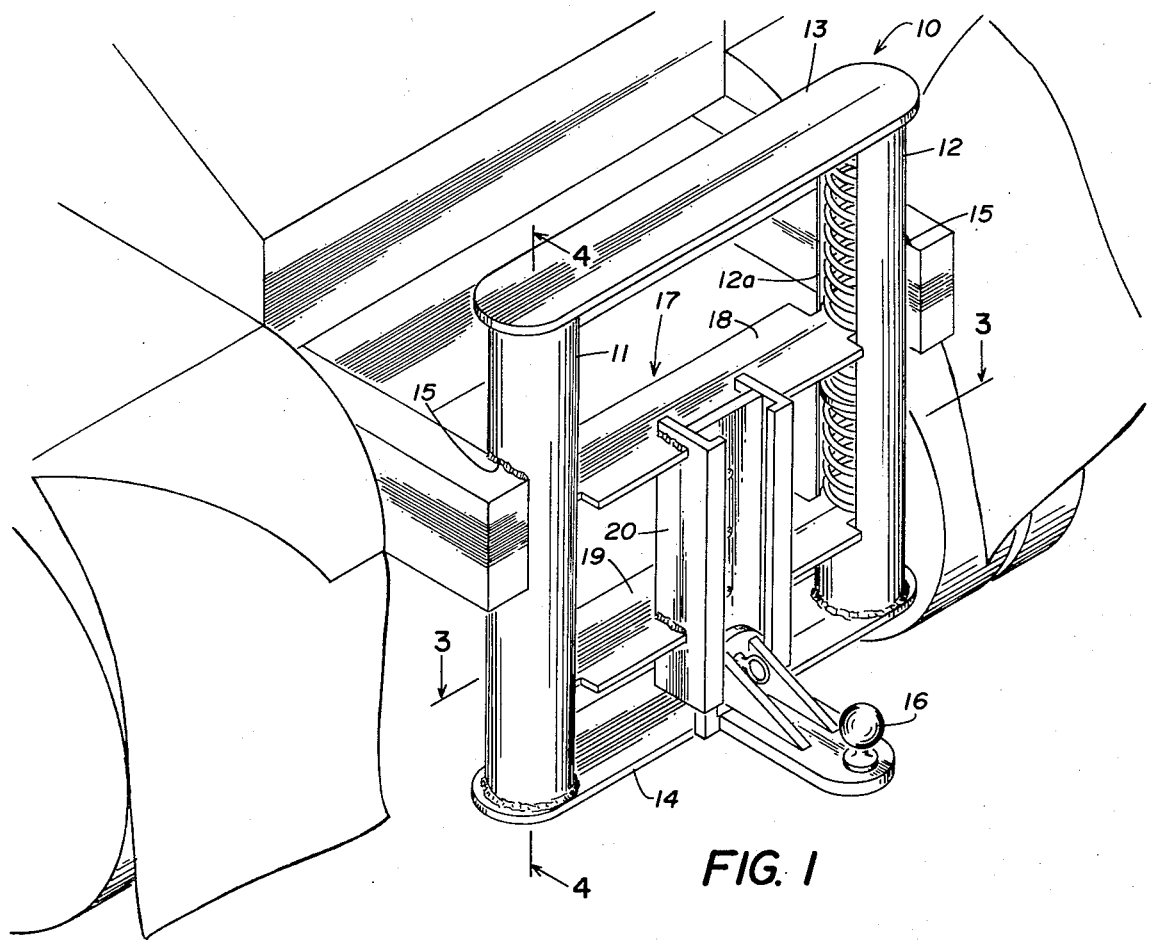
FIG. 1 is a perspective view of an improved trailer hitch of this invention.

Now referring to the drawings and particularly to FIG. 1, the improved hitch 10 of this invention is shown in perspective and includes a frame formed by tubular side members 11 and 12 which are held in spaced relationship by horizontal support members 13 and 14. The resulting frame is adapted to be immovably attached to the rear of a towing vehicle, such as to the rear of a diesel powered truck tractor by suitable means, such as welding at points 15. It is noted that hitch 10 can be connected to any suitable vehicle chassis by welding at other points on the frame as desired.

Figure 2:
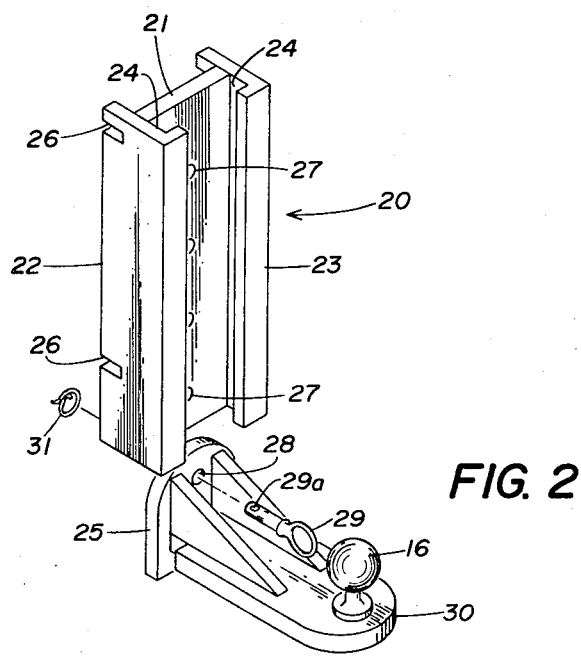
FIG. 2 is an exploded view of a detail of FIG. 1 showing the movably mounted connector joint.

Ball joint 16 is adjustably mounted on drawbar member 17. Drawbar member 17 comprises a pair of horizontal elements 18 and 19 held in fixed spaced relationship by vertical support member 20. As shown in FIG. 2, vertical support member 20 comprises a back plate 21 connected to a pair of opposed sidewalls 22 and 23, which generally have L-shaped cross-sectional configurations and cooperate with back plate 21 to thereby form a pair of guiding slots 24 for receiving slide plate 25. Sidewalls 22 and 23 generally extend rearwardly from back plate 21 and carry slots 26 for receiving horizontal elements 18 and 19 when in position on drawbar member 17.

Back plate 21 carries a series of apertures 27, which are adapted to align with locking aperture 28 through slide plate 25 and thereby receive locking pin 29. Slide plate 25 carries platform 30 with ball joint 16 extending vertically therefrom. Slide plate 25 can be adjusted within guiding slots 24 of vertical support member 20 so that locking aperture 28 will register with one of the apertures 27, and locking pin 29 is inserted therethrough. Locking ring 31 is then inserted through aperture 29a of locking pin 29 to assure that vibratory force will not disengage locking pin 29.

Figure 3:
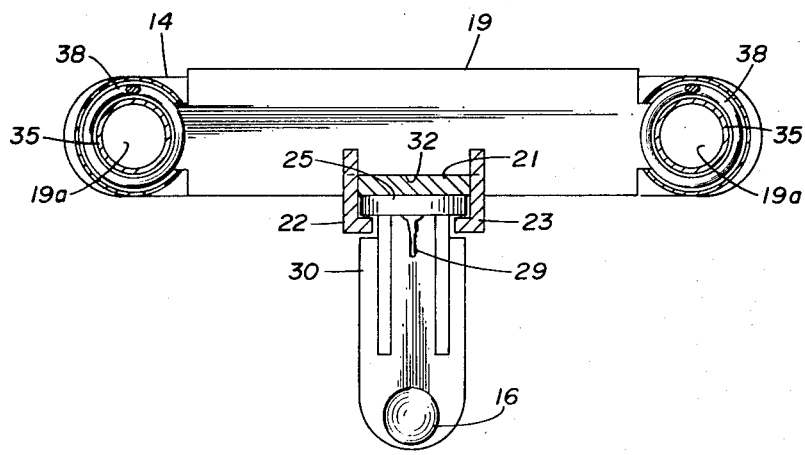
FIG. 3 is a sectional view along lines 3—3 of FIG. 1.

As shown in FIGS. 1 and 3, vertical support member 20 is positioned to fit within cutout sections 32 of horizontal elements 18 and 19, such that back plate 21 and sidewalls 22 and 23 are flush therewithin and slots 26 extend over portions of horizontal elements 18 and 19. Vertical support member 21 is welded to horizontal elements 18 and 19 to thereby form the drawbar member 17.

Figure 4:
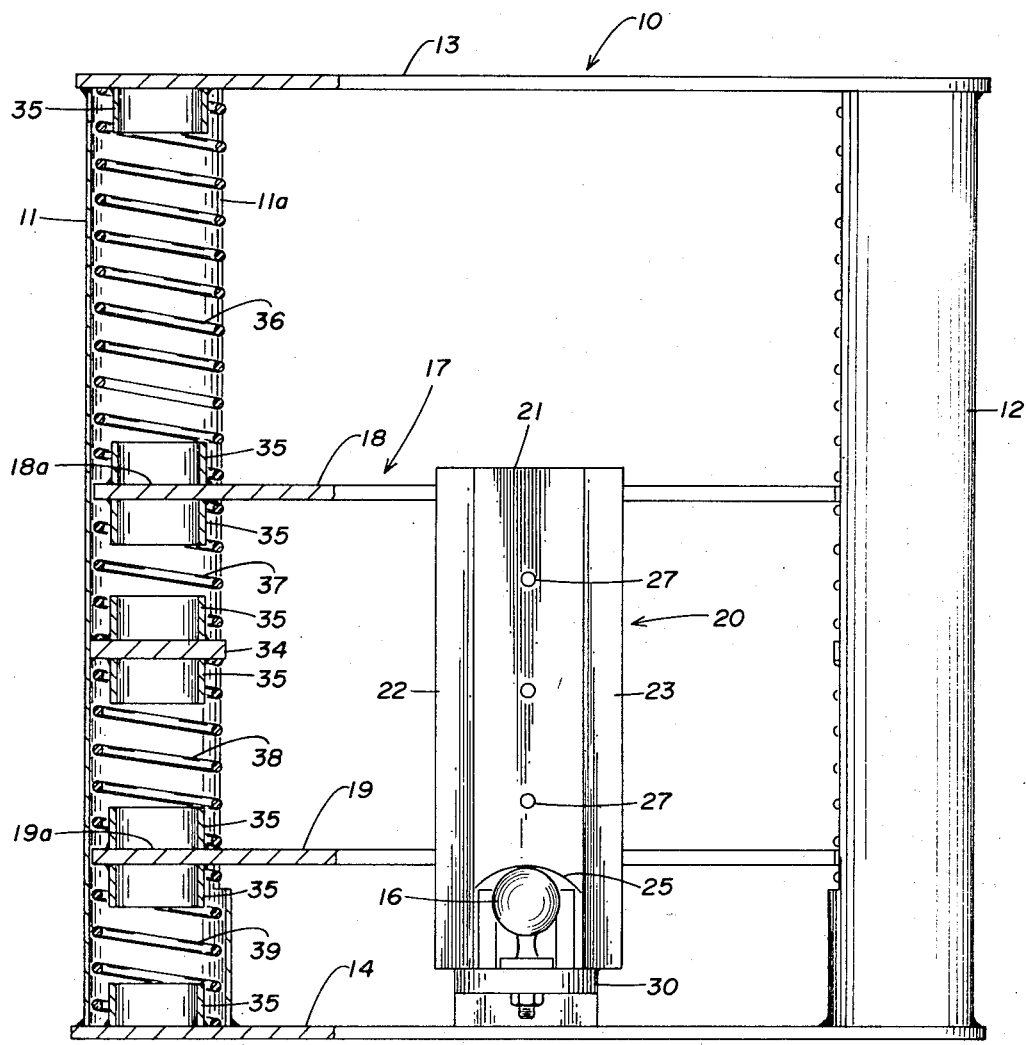
FIG. 4 is a sectional view along lines 4-4 of FIG. 1.

As shown in FIGS. 1, 3 and 4, horizontal elements 18 and 19 extend through longitudinal slots 11a and 12a of tubular side members 11 and 12. End sections 18a and 19a of horizontal elements 18 and 19 are rounded to conform generally to the shape of the interior of tubular side members 11 and 12 and thereby fit in an interlocking relationship therewithin. Thus, drawbar member 17 is thereby adapted to move substantially only vertically between horizontal support members 13 and 14 within the frame of hitch 10.

Now referring to FIGS. 1 and 4, the spring suspension system within tubular side member 11 is shown in detail. It is noted that the spring suspension system in tubular side member 12 is the same as that in tubular side member 11. As illustrated, support plate 34 is attached within tubular side member 11 by suitable means, such as welding, and spring guides 35 are attached to both sides of the support plate 34, to both sides of end sections 18a and 19a of horizontal elements 18 and 19, and from the inside portions of horizontal support members 13 and 14. Coil spring 36 extends between the upper portion of end section 18a of horizontal element 18 and horizontal support member 13, coil spring 37 extends between the upper portion of support plate 34 and the lower portion of end section 18a of horizontal element 18, coil spring 38 extends between the upper portion of end section 19a of horizontal element 19 and the lower portion of support plate 34, and coil spring 39 extends between horizontal support member 14 and the lower portion of end section 19a of horizontal support member 19. As illustrated, each coil spring fits over a corresponding spring guide 35. In this manner, drawbar member 17 is fully suspended within the frame by the coil springs 36-39 and the coil springs will cushion any vertical movement of drawbar member 17 within the frame. In addition, the frame will only allow drawbar member 17 to move in a substantially vertical plane. Thus, ball joint 16 which extends substantially 90° from platform 30 will thereby move substantially only in a vertical plane and no unwanted stresses will develop in a towed trailer, such as a mobile home, which will normally develope when the ball joint is allowed to move in an arcuate plane.

In operation of the improved hitch of this invention, the frame is initially connected to the chassis of a suitable towing vehicle, such as a truck tractor, in an immovable manner, such as by welding, at points 15. Next, ball joint 16 is adjusted to a suitable height to pull a particular trailer by removing locking pin 29, and adjusting slide plate 25 within vertical support member 20 in the proper position wherein locking aperture 25 registers with an aperture 27, pin 29 is then inserted therethrough, and locking ring 31 is positioned through aperture 29a of pin 29 to lock it firmly in position. The socket on the tongue of the trailer is then attached to ball joint 16 in a conventional manner. Drawbar member 17 thus directly transmits the load from the trailer to the frame of hitch 10, which is immovably attached to the rear of the towing vehicle. As relative vertical motion develops between the trailer and the tractor during hauling, the coil springs within tubular side members 11 and 12 will act upon end sections 18a and 19a of horizontal elements 18 and 19 to thereby absorb or dampen any upward or downward movement of drawbar member 17. This action lessens the shock of such vertical movement on both the towed trailer and the towing vehicle. In addition, interlocking action between end sections 18a and 19a and tubular side members 11 and 12 prevents any horizontal movement of drawbar member 17 and ball joint 16 during the shock absorbing action. This will thereby prevent undue stress from developing along the length of a towed trailer which is otherwise present when the ball joint is subjected to arcuate movement. The particular configuration of hitch 10 as shown in the drawing is highly effective in adsorbing or dampening relative motion between a trailer and a towing vehicle.

While this invention has been described in relation to the preferred embodiments, it will be understood that various modifications thereof will now be apparent to one skilled in the art upon reading this specification, and it is intended to cover such modifications as fall within the scope of the appended claims.

I claim:

1. A hitch for connecting a trailer to a towing vehicle comprising:
   a. a frame means adapted to be immovably attached to a towing vehicle which includes a pair of tubular side members vertically disposed in a spaced parallel relation, a pair of horizontal support members, each rigidly connected at their end portions to the upper and lower portions of said pair of tubular side members, said tubular side members having opposed, longitudinal slots therethrough;
   b. a drawbar member disposed in said frame between said tubular side members and having end sections extending through said slots of said tubular side members, thereby allowing said drawbar member to be slidably positioned in said slots between said horizontal support members;
   c. compression spring members engaging said end sections within said tubular side members to thereby resist vertical movement of said drawbar member in said frame; and
   d. a connector joint for joining a trailer to a towing vehicle, said connector joint operatively connected to said drawbar member.

2. The hitch of claim 1, wherein said connector joint is adjustably mounted on said drawbar member.

3. The hitch of claim 2, wherein said drawbar member comprises a pair of horizontal elements held in fixed spaced relationship by a vertical support member and wherein said end sections are carried on the ends of each of said horizontal elements.

4. The hitch of claim 3 wherein said connector joint is operatively connected to said vertical support member.

5. The hitch of claim 4, wherein said connector joint is movably connected to said vertical support member.

6. The hitch of claim 5 wherein said connector joint is attached to a slide plate carrying a locking aperture therethrough, and said slide plate is slidably mounted within locking recesses on said vertical support member, and said vertical support member carries a series of vertically spaced apertures therethrough positioned to register with said locking aperture in said slide plate when positioned in alignment therewith, and locking pin means adapted to lock in said apertures to thereby hold said sliding plate in a fixed position on said vertical support member.

7. The hitch of claim 5, wherein a spring support plate is positioned in each of said tubular side members between the end sections of said pair of horizontal elements, and said compression springs positioned in said tubular side members rest against both the upper and lower sides of each of said end sections to resist vertical movement thereof.

8. The hitch of claim 7, wherein compression springs are positioned within each of said tubular side members between the lower end of a tubular side member and the lower portion of the end section of the lower horizontal element of said drawbar member, between the upper portion of the end section of the lower horizontal element of said drawbar member and a support plate, between the lower portion of the end section of the upper horizontal element of said drawbar member and a support plate, and between the top portion of the end section of the upper horizontal element of said drawbar member and the upper end of a tubular side member.

9. The hitch of claim 8, wherein each of said compression springs are coil springs and the open ends thereof rest over tubular seating sections.

10. The combination of a towing vehicle and a hitch for connecting a trailer to said towing vehicle wherein said hitch comprises:
 a. a pair of tubular side members vertically disposed in a spaced parallel relation and immovably attached to the rear of said towing vehicle, said tubular side members having opposed, longitudinal slots therethrough;
 b. a drawbar member disposed in said frame between said tubular side members and having end sections extending through said slots of said tubular side members, thereby allowing said drawbar to be slidably positioned in said slots between said horizontal support member;
 c. compression spring members engaging said end sections within said tubular side members to thereby resist vertical movement of said drawbar members in said frame; and
 d. a connector joint for joining a trailer to a towing vehicle, said connector joint operatively connected to said drawbar member.

11. The combination of claim 10, wherein said connector joint is adjustably mounted on said drawbar member.

12. The combination of claim 10 wherein said drawbar member comprises a pair of horizontal elements held in fixed spaced relationship by a vertical support member and wherein said end sections are carried on the ends of each of said horizontal elements.

13. The combination of claim 12 wherein said connector joint is operatively connected to said vertical support member.

14. The combination of claim 13, wherein said connector joint is movably connected to said vertical support member.

15. The combination of claim 14, wherein said connector joint is attached to a slide plate carrying a locking aperture therethrough, and said slide plate is slidably mounted within locking recesses on said vertical support member, and said vertical support member carries a series of vertically spaced apertures therethrough positioned to register with said locking aperture in said slide plate when positioned in alignment therewith, and locking pin means adapted to lock in said apertures to thereby hold said sliding plate in a fixed position on said vertical support member.

16. The combination of claim 14, wherein a spring support plate is positioned in each of said tubular side members between the end sections of said pair of horizontal elements, and said compression springs positioned in said tubular side members rest against both the upper and lower sides of each of said end sections to resist vertical movement thereof.

17. The combination of claim 16 wherein compression springs are positioned within each of said tubular side members between the lower end of a tubular side member and the lower portion of the end section of the lower horizontal element of said drawbar member, between the upper portion of the end section of the lower horizontal element of said drawbar member and a support plate, between the lower portion of the end section of the upper horizontal element of said drawbar member and a support plate, and between the top portion of the end section of the upper horizontal element of said drawbar member and the upper end of a tubular side member.

18. The combination of claim 17, wherein each of said compression springs are coil springs and the open ends thereof rest over tubular seating sections.

* * * * *